United States Patent [19]

Stolzer et al.

[11] Patent Number: 5,147,176
[45] Date of Patent: Sep. 15, 1992

[54] METHOD OF HANDLING GOODS, AND MORE PARTICULARLY ROD, RAIL OR PLATE GOODS IN BOX PALLETS, AND GOODS HANDLING SYSTEM

[75] Inventors: Armin Stolzer, Renchen; Rudolf Blust, Sasbact-Obersasbach, both of Fed. Rep. of Germany

[73] Assignee: KEURO Maschinebau GmbH & Co. KG, Achern-Gamshurst, Fed. Rep. of Germany

[21] Appl. No.: 542,911

[22] Filed: Jun. 25, 1990

[30] Foreign Application Priority Data

Jul. 12, 1989 [DE] Fed. Rep. of Germany ....... 3922964

[51] Int. Cl.⁵ .............................................. B65G 1/04
[52] U.S. Cl. .................. 414/786; 198/346.1; 364/478; 414/273; 414/286; 414/281; 414/278
[58] Field of Search ............... 414/267, 268, 269, 270, 414/271, 272, 273, 274, 275, 277, 348, 351, 278, 279, 344, 340, 280, 281, 342, 284, 331, 222, 786; 198/346.1, 346.2; 364/435, 614, 478

[56] References Cited

U.S. PATENT DOCUMENTS

| 3,513,988 | 5/1990 | Wilson | 414/746.1 |
| 3,779,403 | 12/1973 | Young | 414/281 X |
| 4,195,347 | 3/1980 | MacMunn et al. | 414/273 X |
| 4,778,325 | 10/1988 | Stolzer et al. | |
| 4,786,229 | 11/1988 | Henderson | 414/273 X |
| 4,932,828 | 6/1990 | Katae et al. | 414/273 X |
| 5,002,449 | 3/1991 | Kita et al. | 414/273 |

FOREIGN PATENT DOCUMENTS

| 29073 | 5/1981 | European Pat. Off. | 414/284 |
| 268965 | 6/1988 | European Pat. Off. | |
| 7708142 | 3/1979 | Fed. Rep. of Germany. | |
| 2925469 | 1/1981 | Fed. Rep. of Germany. | |
| 3403244 | 8/1985 | Fed. Rep. of Germany. | |
| 3602201 | 10/1987 | Fed. Rep. of Germany. | |
| 3708401 | 9/1988 | Fed. Rep. of Germany. | |
| 392386 | 9/1965 | Switzerland | 414/278 |

Primary Examiner—Frank E. Werner
Attorney, Agent, or Firm—Frishauf, Holtz, Goodman & Woodward

[57] ABSTRACT

A goods handling system in which elongated goods such as rails, rods or plates are located in storage boxes or cassettes (12), and in which the storage boxes or cassettes are placed on racks having rack supports (15) above each other, the racks being located in a warehouse-type arrangement, with passageways therebetween. Cranes or hoists (19-23) can transfer the cassettes from a storage location in the racks to a horizontally movable transport wagon, which can transport the cassettes to a utilization station (40), for example for reloading, unloading and the like. A control unit (CU) keeps track of the respective cassettes which are interchanged, at random, in the racks, by placing an empty cassette into a storage location from which a full cassette, on which work is to be done, is removed. This permits control of the crane or hoist, and movement of the transport wagon to result in only a single meeting place, and a single horizontal movement of the wagon and a single vertical up-down movement of the crane or hoist, the wagon having two, and preferably three storage locations next to each other so that shift of a pallet box or cassette on the wagon from a loading to an empty position can be done while the wagon is moving, thus resulting in substantial time saving in interchange of cassettes in the racks.

8 Claims, 16 Drawing Sheets

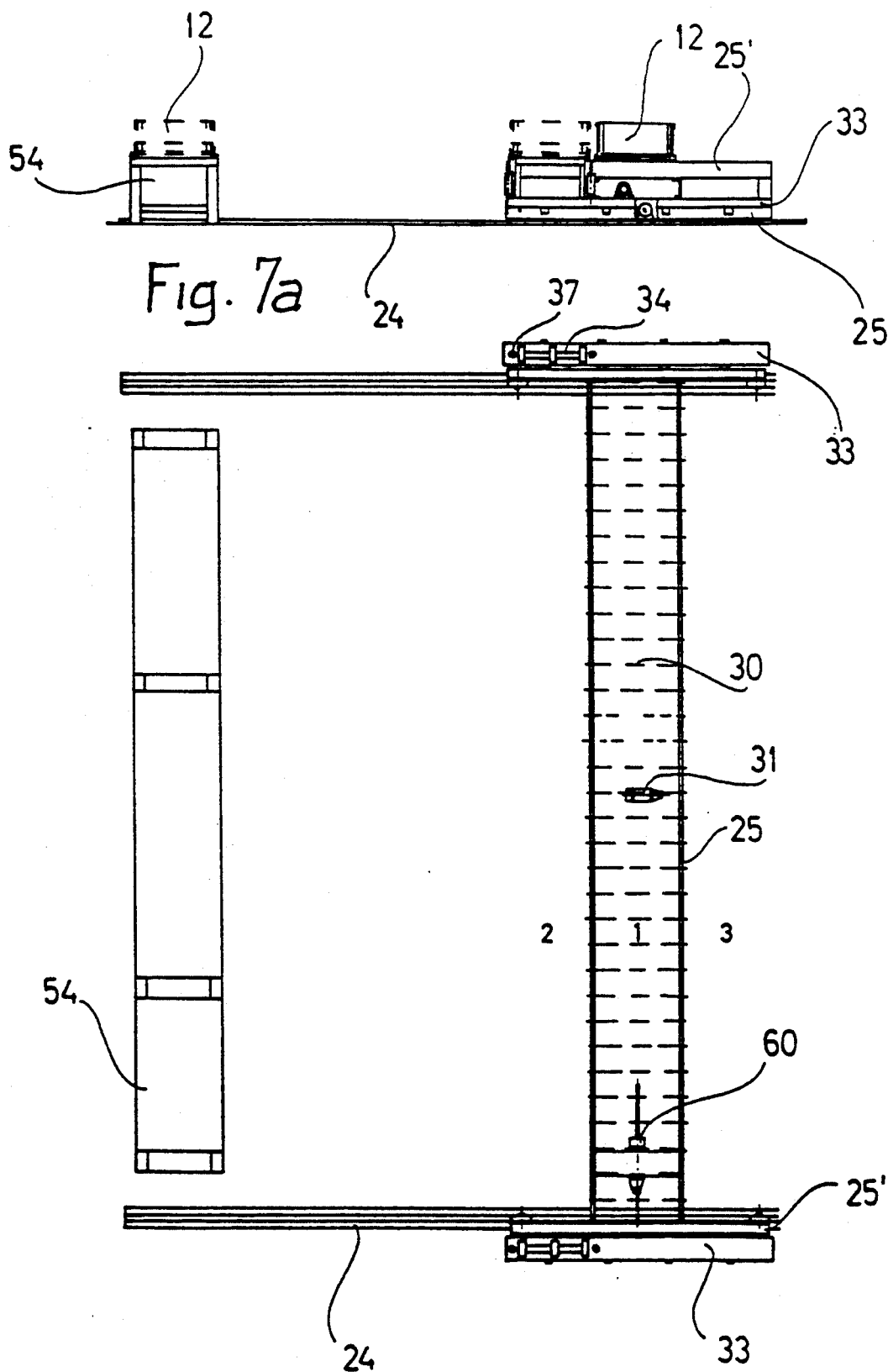

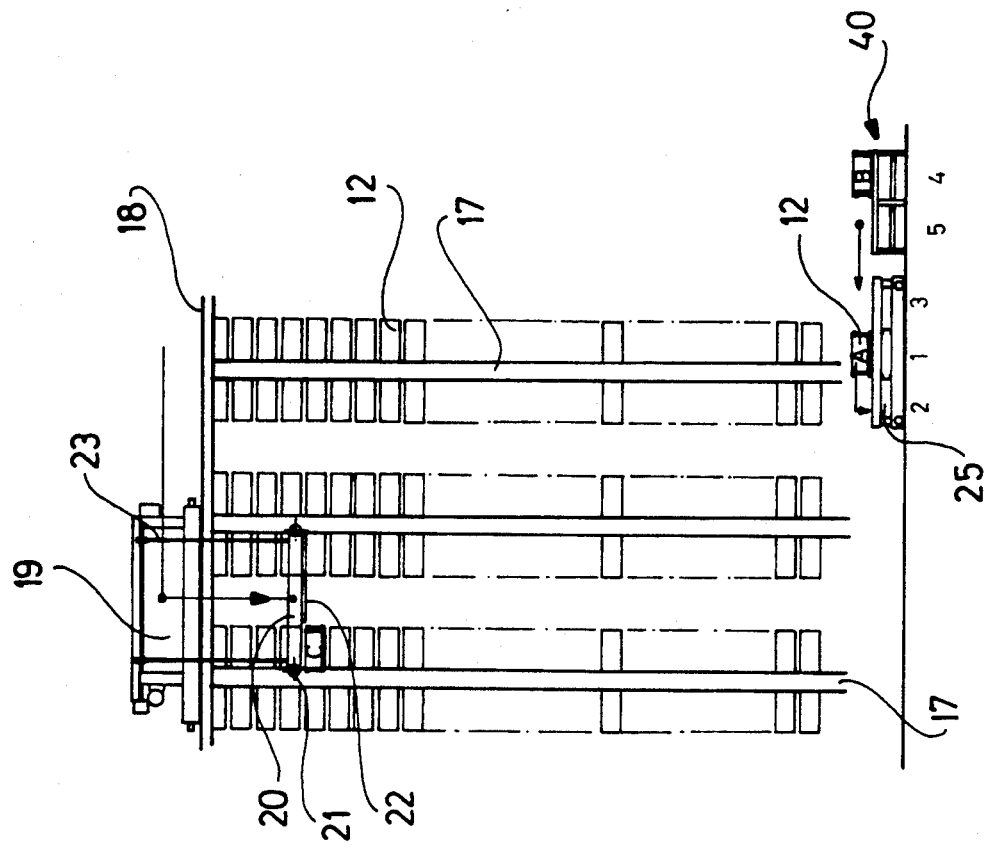
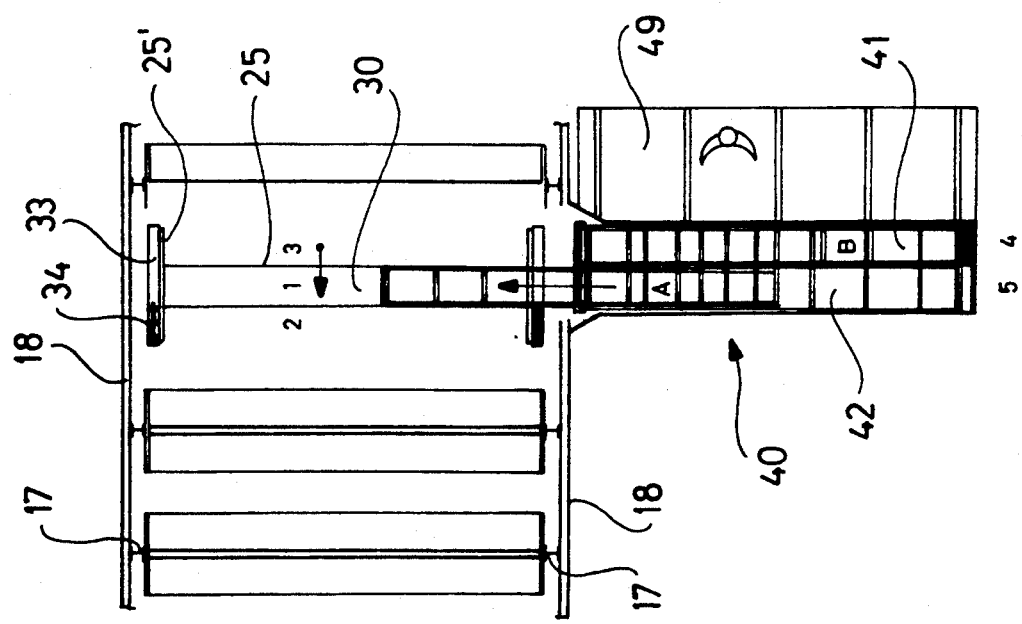

METHOD OF HANDLING GOODS, AND MORE PARTICULARLY ROD, RAIL OR PLATE GOODS IN BOX PALLETS, AND GOODS HANDLING SYSTEM

FIELD OF THE INVENTION

The present invention relates to a method and system to handle goods in pallet boxes or cassettes which, in plan view, are essentially rectangular, and for storing and removal from storage of the pallet boxes or cassettes, and especially to such pallet boxes or cassettes capable of retaining rod, rail or plate material, for storage at a plurality of storage locations and transfer between at least one utilization station and various storage locations.

DEFINITION

Reference will be made in the specification and claims to a "longitudinal side". This is intended to mean the longer side of a pallet box or cassette of essentially rectangular plan outline. This terminology is used for ease of explanation although the invention is not restricted to pallet boxes of, in plan view, essentially rectangular outline.

BACKGROUND

U.S. Pat. No. 4,778,325, by the inventors of the present application, and to which German Patent 36 02 201 corresponds, describes a shelf service apparatus for storage of rod-shaped material located in self-supporting pallet boxes. The pallet boxes can be lifted by supports on their end faces for movement, horizontally and vertically, by a crane bridge, which spans a storage rack system on which the cassettes can be placed. The crane bridge carries lifting devices which are capable of interengaging with the pallet boxes so that they can be lifted off shelf brackets or the like in a storage rack system, and transported from one location to another, or to a floor station in a gangway between the rack system.

Rack systems are also known in which racks are arranged longitudinally next to each other and in essential alignment, with brackets, such as pallet supports, extending transversely from major support posts of the racks, longitudinally of the major direction of the pallet boxes or cassettes. The storage rack structures are spaced from each other to define rack passageways or gangways in the space between adjacent racks. One or more transport wagons can be guided, for example on rails, for moving the pallet boxes from a storage location to a utilization station, for example a reloading station, cutting station or the like. The transport wagon has room for at least two adjacent pallet boxes, and is arranged to pass at least in part beneath the lowest ones of the support brackets of the racks. The crane forms a load transferring apparatus, and is movable in direct passageways or gangways as well as transversely to the longitudinal boxes to transfer pallet boxes between storage locations, between a storage location and a transport wagon and the like. The transport wagon, preferably, has a conveyor thereon so that a pallet box located on the transport wagon, for example deposited by the crane, can be moved on the transport wagon.

The transport wagon is movable between a position where it can be loaded by the crane and the utilization station, to transport pallet boxes or cassettes loaded thereon to and from the utilization station.

Storage and transfer systems, as well as methods of storing and transferring goods, are described also in German Patent Disclosure Document DE-OS 37 08 401, in which a pallet box which is to be stored in a storage system is to be transported by the transport wagon to a position where a next subsequent cassette is to be placed on the transport wagon. The next subsequent cassette carrying goods to be then processed is placed on the transport wagon, the transport wagon then moved to the position in which the first pallet to be stored is to be placed, and the crane then hoists the pallet box to its assigned storage location. Thereafter, the transport wagon moves, for example to the utilization station or the like, to deliver the subsequently placed pallet box thereto.

This is a complex and time-consuming arrangement. The transport wagon, which cannot move very quickly, has to move back and forth between a reception position and a storage position; likewise, the crane has to first move twice, first to a delivery position for the subsequent cassette, and then to the storage position for the previously handled pallet box or cassette; each time, the transport wagon must start and stop and the crane likewise must move, start, stop, and lift or drop its hoisting apparatus.

THE INVENTION

It is an object to provide a method for transferring goods retained in pallet boxes or cassettes which involves minimum time for movement of the transport carriage and/or a transporter crane, and is economical with respect to handling effort in connection with transfer of the pallet boxes or cassettes, and to so arrange the apparatus that pallet boxes or cassettes can be shifted and handled for storage, or transport to a utilization station in minimum time and with minimum effort.

Briefly, in accordance with a feature of the invention, a storage means such as a pallet box or cassette on a transport wagon, and forming a replacement storage means, which is to be positioned in a storage rack, is placed at a random location in the storage rack, which random location, however, is known or recorded in a control unit. This random location is determined by the position in which a pallet box is located and which contains goods which are to be handled subsequently. This pallet box, termed, or forming an exchange storage means, is to be placed on the wagon, in exchange for the prior or replacement storage means then on the wagon. This replacement storage means is to be removed from the wagon and, as stated, placed on the storage rack at the identified location.

In other words, the replacement pallet boxes from the wagon are no longer assigned specific locations within the storage racks, but are placed, at random, at that location from which an exchange, or prior pallet box is to be removed. This is made possible, in part, by so constructing the transport wagon that it includes lateral shift apparatus, operatively engageable with a pallet box on the transport wagon, to shift the pallet box on the transport wagon in a direction transverse to the longitudinal direction of the goods between adjacent preassigned pallet box locations on the transport wagon. These lateral shift devices may include apparatus to lift the pallet box off a pallet box location to then permit lateral shifting to another, adjacent pallet box location.

The method and system has the advantage that movement of the transport wagon from a location accessible to the storage racks to a utilization station can be done while a crane or hoist repositions the storage cassette which just had been delivered by the transport wagon; as the transport wagon moves towards and back from a utilization station, the next subsequent pallet box can be removed by the crane or hoist apparatus for placement on the transport wagon. The apparatus on the transport wagon which permits both longitudinal as well as lateral shift of the cassette or pallet box thereon permits placement of the pallet box in the appropriate positions while the transport wagon is moving.

The gist of the invention, thus, permits assigning only a single junction or meeting point between the crane or hoist apparatus and the transport wagon required for interchange of pallet boxes on the transport wagon. During movement of the transport wagon, for example in direction of the utilization station, the previously removed pallet box is placed on the storage rack. The next pallet box to be handled can then be removed from the storage rack by the crane or hoist for interchange with the then existing pallet box on the transport wagon at the next meeting place between the crane or hoist and the transport wagon. The transport wagon may not even have to stop for interchange of cassettes thereon.

As soon as the pallet box to be removed from the transport wagon has been actually picked up by the crane, the transport wagon can start, or continue previous movement towards the utilization station. As the transport wagon moves towards the utilization station, the pallet box to be stored is placed in the empty position from which the previous pallet box was removed.

The method and system permits placement of the pallet boxes or cassettes at random positions within the storage rack system. This is entirely suitable and contrary to prior art arrangements in which each pallet box is assigned a specific location. Modern data handling and recording systems, which can be readily updated, can easily keep track of which specific pallet box or cassette, containing specific goods, is in what location at any given time. The system permits simultaneous movement of the transport wagon and handling of pallet boxes for storing, or removal from storage, and thus substantially reduces the time as well as the distances to be covered by the transport wagon and the crane system. The required path to be covered by the transport wagon can be matched to the paths to be covered by the rack storage servicing apparatus, that is, a crane or hoist and only such movements are done which are absolutely necessary, for minimum path distances and minimum time and handling of the pallet boxes.

The method has the further advantage that the carriage and the rack servicing apparatus need have only a single meeting position at the bottom of a rack passageway or gangway, which permits optimal utilization of the movement of the pallet boxes for interchange previously required for exchange of pallet boxes on the transport wagon.

In accordance with a feature of the invention, the pallet boxes are transferred laterally on the wagons while the wagons are moving, so that when the transport wagons have reached a terminal position, for example in alignment with a rack passageway or gangway, or at a utilization station, the respective pallet box is at the position for immediate transfer to the utilization station or, respectively, to the rack servicing apparatus, thereby providing for time-saving handling of the pallet boxes.

The entire arrangement, as well known, can be automatically controlled, for example by a data processing or control system of any suitable type. It is only necessary that the data processing system has sufficient storage capability to keep track of which cassette or pallet box with what specific goods therein is in a specifically coded storage location in the rack system; transfer to and fro can then be automatically controlled since the distances, both horizontally and vertically, to be covered are known and the time for loading, unloading or transferring cassettes or pallet boxes through those distances, vertically and/or horizontally, are also known. Thus, simultaneous handling of pallet boxes under control of an automatic or computer controlled system while the rack servicing apparatus, such as a hoist or crane, and/or the transport wagon are both moving, is readily possible. Any suitable and well known data processing system can be used, programmed in accordance with standard programming procedures.

DRAWINGS

FIG. 7a is a partial side view of FIG. 6;

FIG. 7b is a top view of a loading station and system of FIG. 7a, and omitting the storage rack system;

FIGS. 8 through 18 illustrate sequential steps in loading, transporting, unloading and reloading storage boxes, and in gereral the sequential steps in handling storage boxes between the rack system and a utilization station in accordance with a first embodiment of the invention; and FIGS. 19 through 25 are figures similar to those of FIGS. 8-18, but illustrating, generally, a sequence of steps in accordance with another embodiment of the invention.

DETAILED DESCRIPTION

Figure 1:
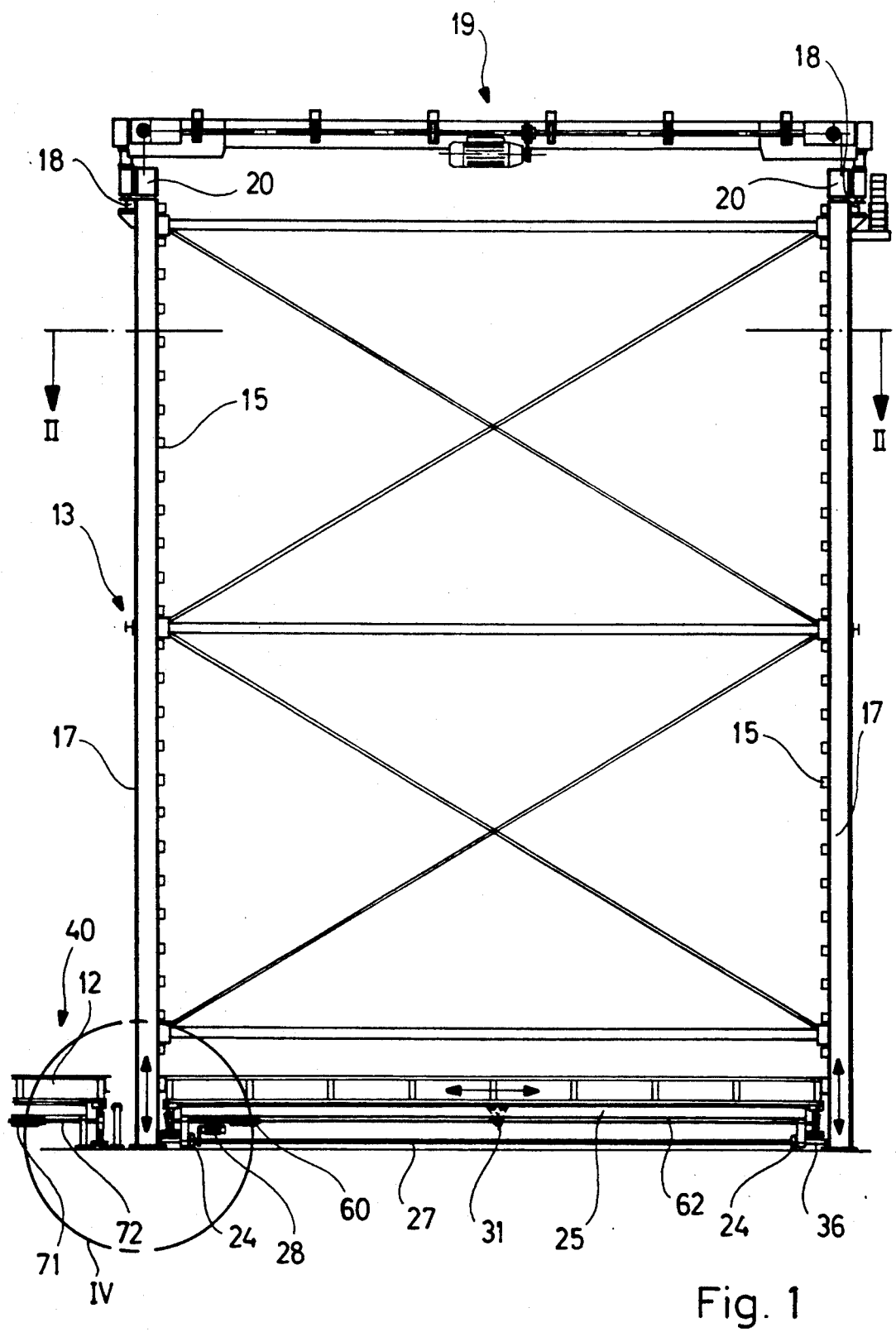
FIG. 1 is an end view of a storage rack system and of the storage racks taken in the direction of the arrow I of FIGS. 2 and 3.
Figure 2:
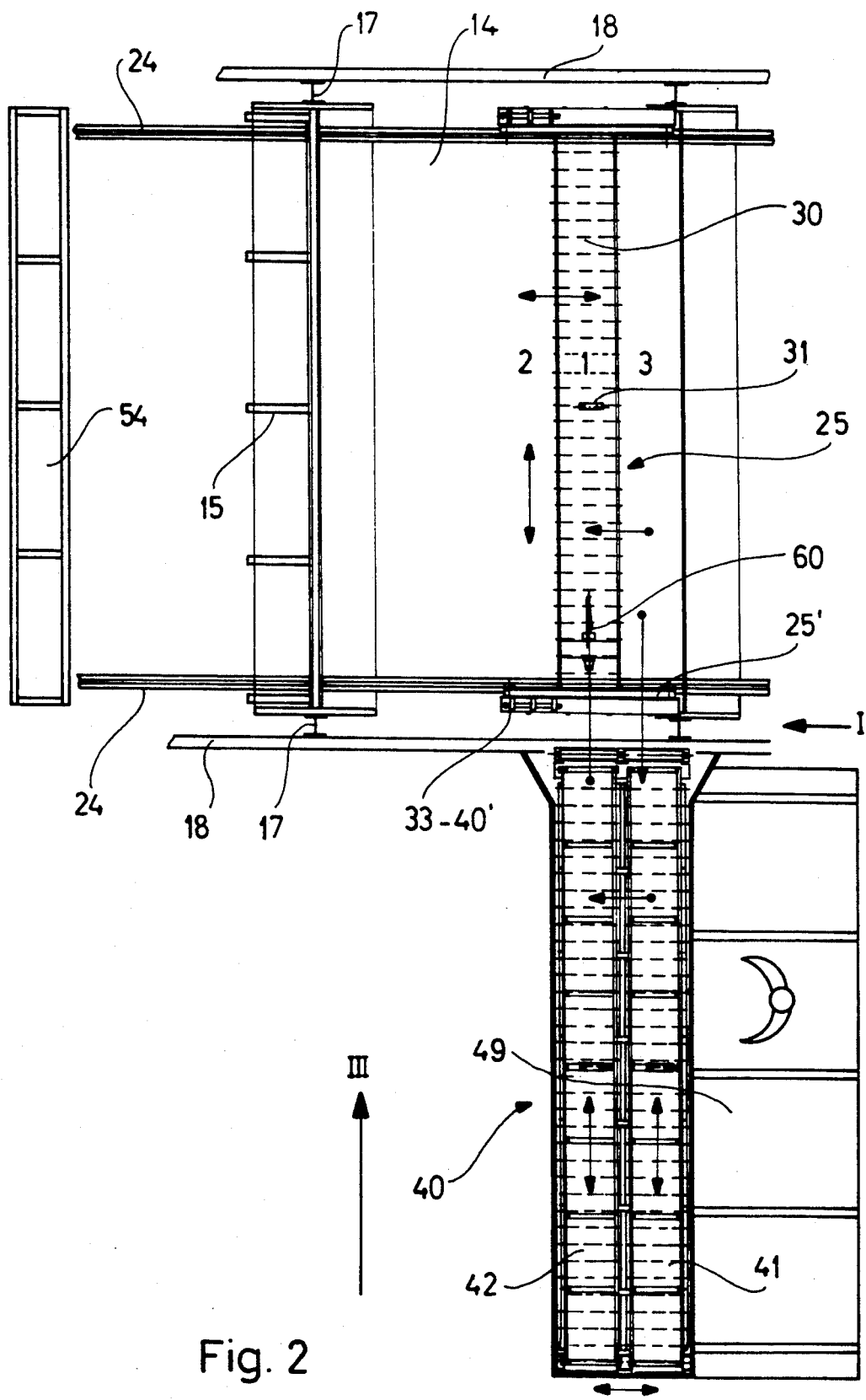
FIG. 2 is a top view of the storage racks and storage rack system of FIG. 1 looked at in the plane of the section line II—II of FIG. 1.
Figure 3:
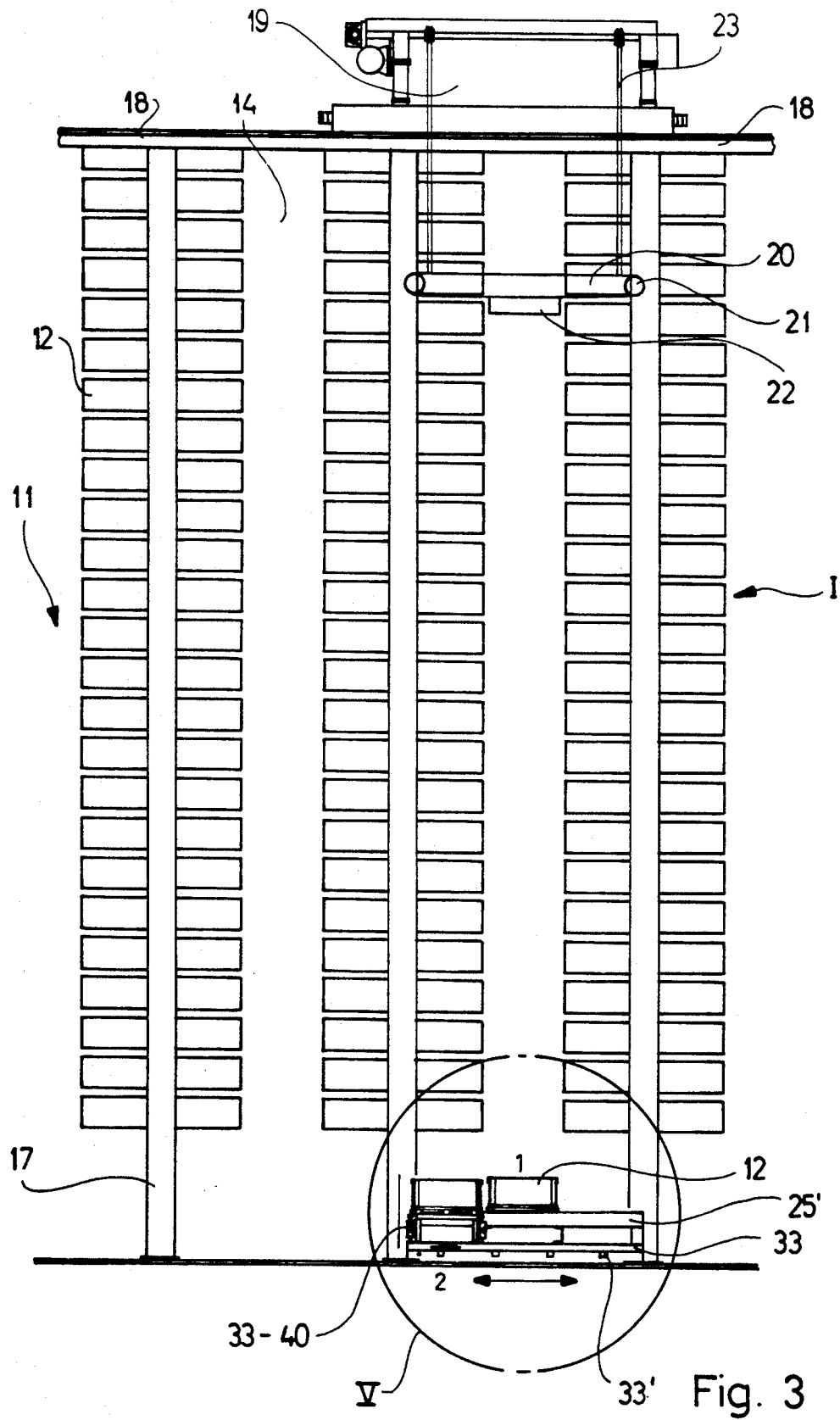
FIG. 3 is a front view of the storage rack system taken in the direction of the arrow III in FIGS. 1 and 2.

The storage rack system, see particularly FIGS. 1–4, is in general a rack structure 11 for pallet boxes or cassettes 12. The rack structure system has vertical posts or supports 17 holding thereon lateral carrier arms 15. The post supports 17 with the carrier arms 15 form storage racks 13, placed next to each other transversely to the longitudinal extent of the cassettes 12, and separated from each other by gangways or rack passageways 14 (FIGS. 2 and 3). The carrier or pallet box support arms 15 extend transversely to the longitudinal direction of the goods or the pallet boxes, to form storage locations for the pallet boxes 12. The pallet boxes 12, at their end surfaces, are formed with holding structures 16 (FIG. 4), facing outwardly, and generally in the shape of U-channels, so that they can be engaged with the pallet box support arms 15. The arrangement to support the pallet boxes is known and described in detail in the referenced U.S. Pat. No. 4,778,325, the disclosure which is hereby incorporated by reference.

The support posts 17 of the racks 13, which carry the support arms 15, also carry rack service system 19 having a cross beam 20, which can be raised and lowered, the load cross beam 20 being guided on the posts 17 by suitable rollers 21 (FIG. 3), as described in detail in the referenced U.S. Pat. No. 4,778,325. The servicing system 19 carries fork-shaped load support elements 22 (FIG. 3) which can be engaged with the U-shaped end pieces 16 (FIG. 4) on the pallet boxes 12. The loading beams 20, located at both sides of the racks 13, can be raised or lowered by chains 23 (FIG. 3) by suitably synchronized motor drives.

A transport carriage or wagon 25 or 25' (FIGS. 3, 4) can pass between the supports 17 on tracks 24 extending transversely to the longitudinal side of the pallet boxes 12, in which the respective transport carriage can pass beneath the respective cassettes. FIGS. 1 and 3 illustrate the transport wagon 25, the details of which are shown and will be described in connection with FIGS. 4 and 5.

Figure 4:
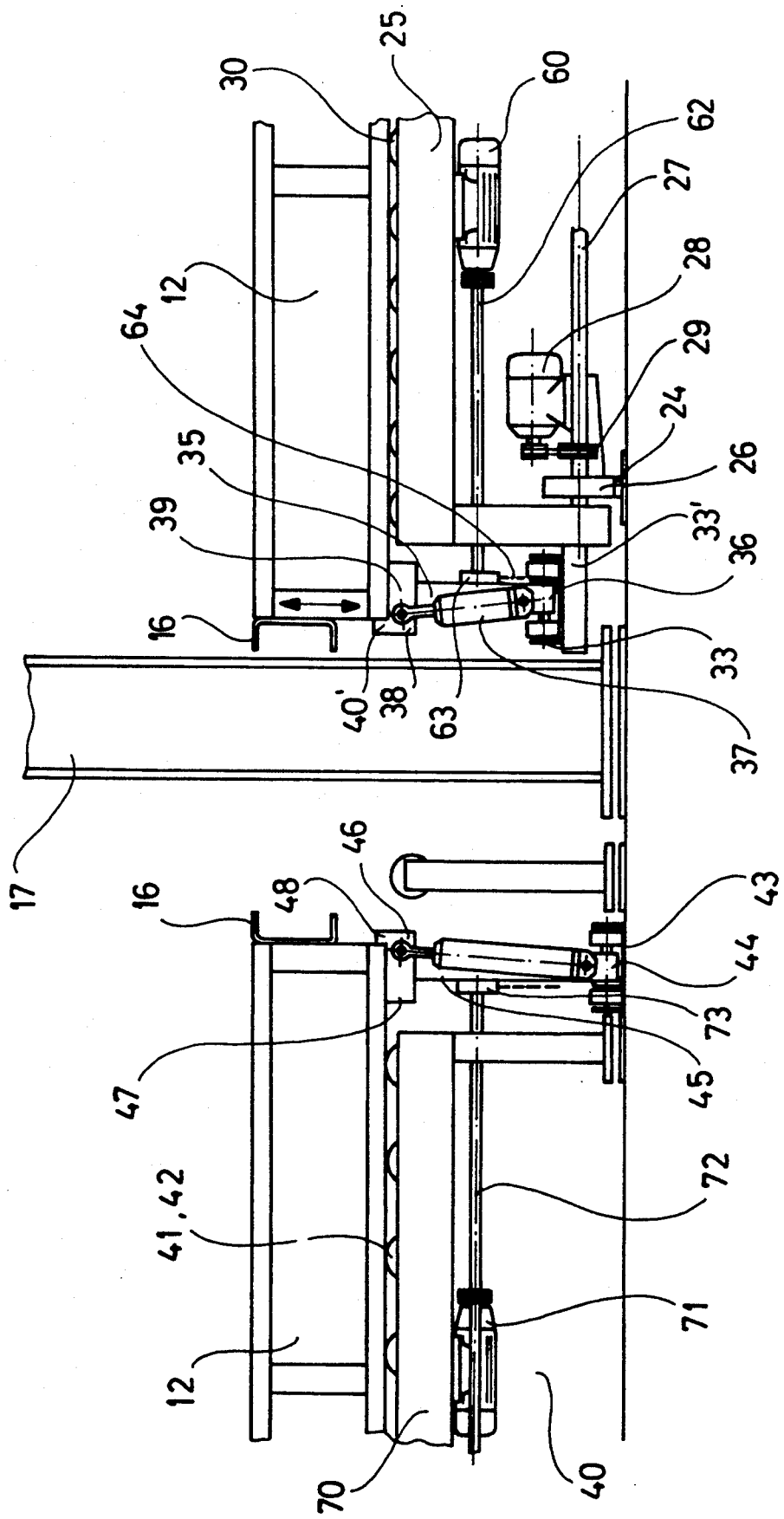
FIG. 4 is a highly enlarged view of the portion within the circle IV of FIG. 1.
Figure 5:
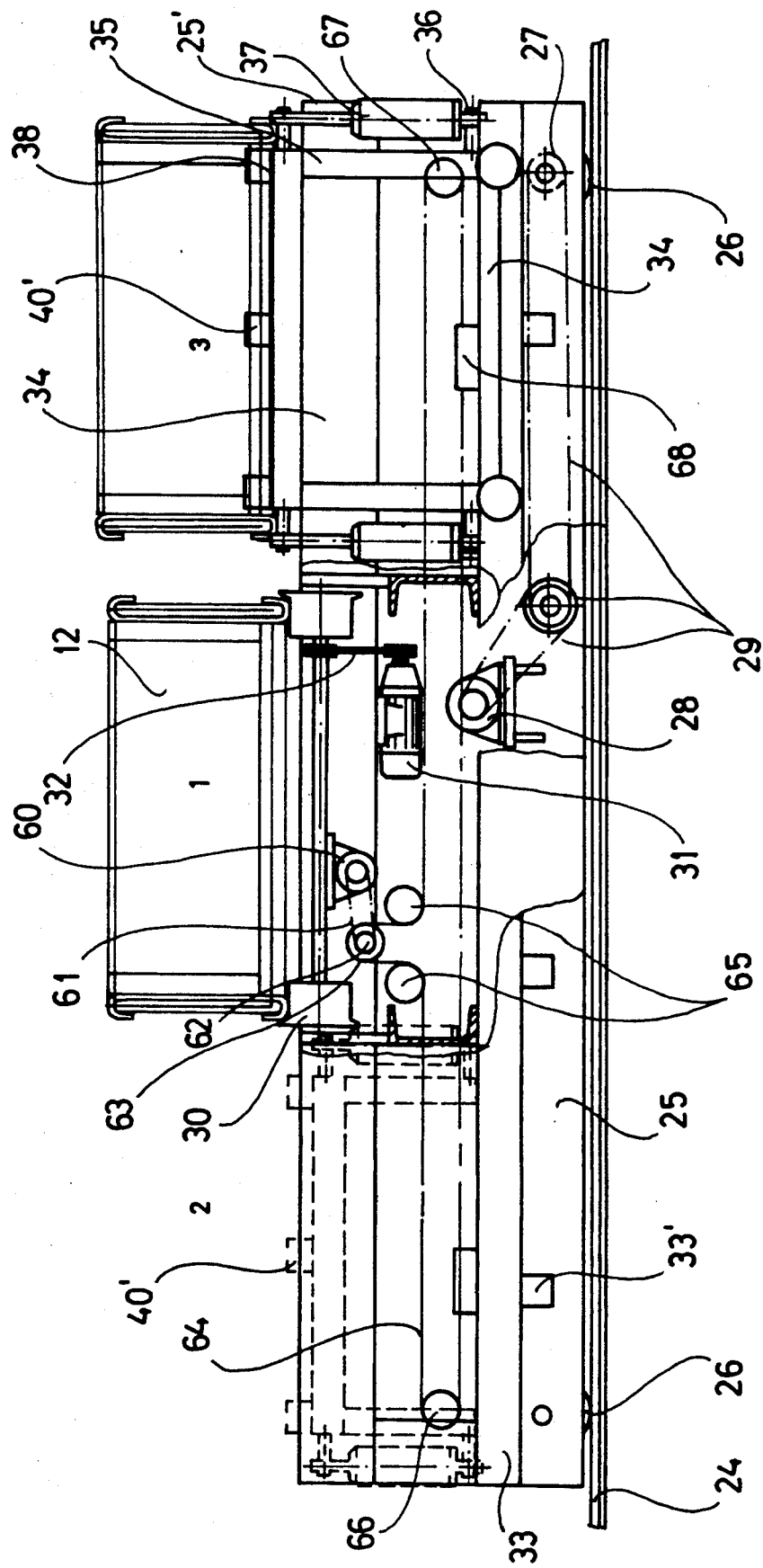
FIG. 5 is a highly enlarged view of the portion within the circle V of FIG. 3.

Referring now to FIGS. 4 and 5;

The transport wagon 25 is movable on rails forming the tracks 24. Wheel 26, of which at least one pair is coupled by a shaft 27, can be driven by a motor 28 by a suitable drive transmission 29. Of course, the wheels could be driven individually, as well known, by individual motors which are suitably synchronized with respect to direction and speed. Motor control and control connections, for example a signaling rails and the like as well as power connections to the motor have been omitted from FIGS. 4 and 5 since they can be in accordance with any well known and standard arrangement.

FIG. 5 illustrates three pallet box positions 1, 2, 3 located next to each other on the transport wagon, and positioned transversely with respect to the longitudinal direction of the pallet boxes. The center pallet box position 1 further includes a conveyor 30 having rollers which can be driven by a motor 31 via a drive coupling 32 in both directions, longitudinally of the pallet box or cassette on the wagon 25.

Figure 6:
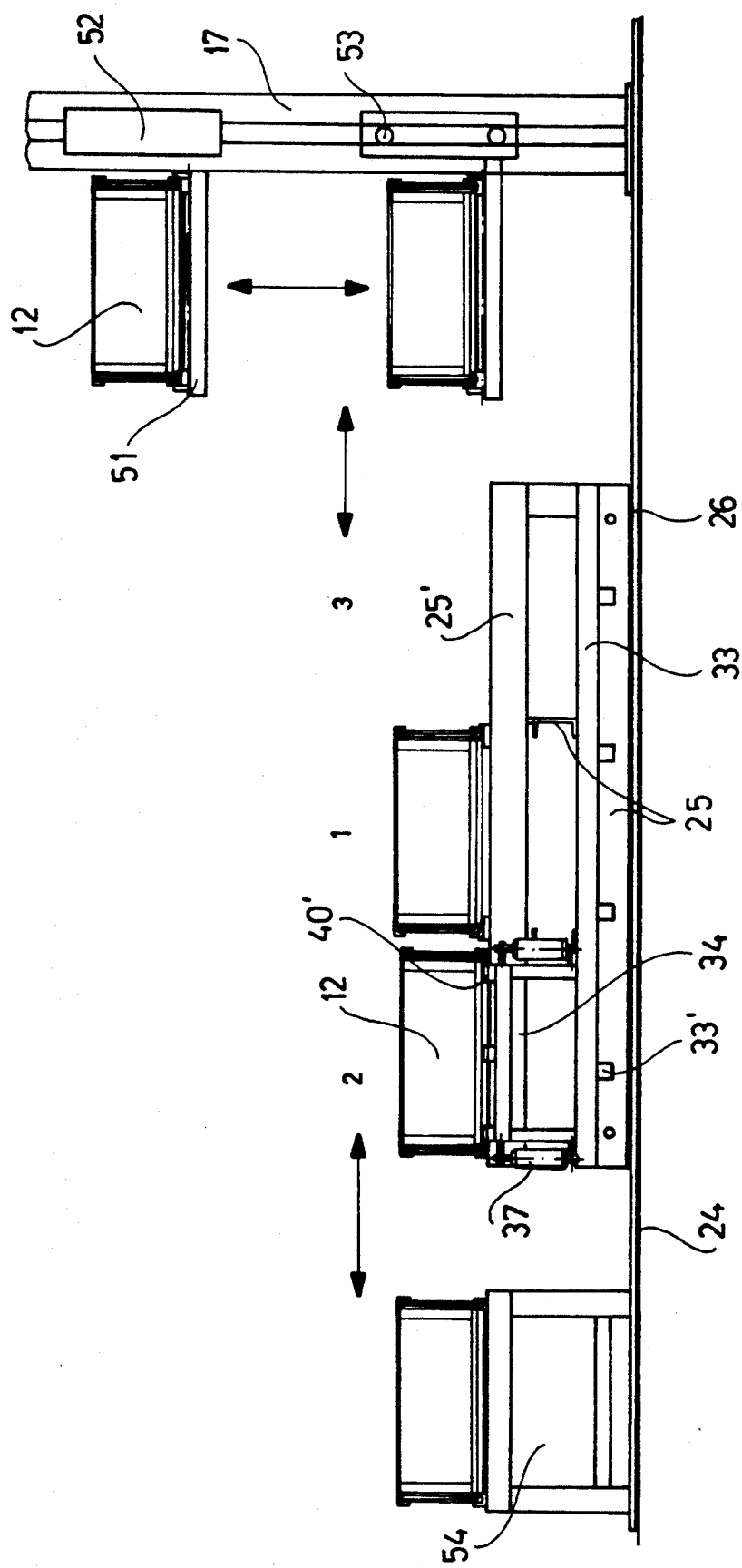
FIG. 6 illustrates loading a storage box on the storage racks.

The two lateral pallet box positions 2 and 3 are formed, generally, by a support surface of the transport wagon 25, to support pallet boxes 12 thereon, as best seen in FIGS. 6 and 7. These support surfaces are formed by beams 25' extending transversely to the longitudinal direction of the transport wagon 25.

The transport wagon 25, in the region of the two end sides of the pallet boxes or cassettes 12, is formed with external rails 33, supported by suitable braces or beams 33' on the frame of the wagon. The rails 33 support tracks or dolleys 36 which hold the lower portion of a lifting support 35 for a skid or sled 34 of a lateral shifting system. The holding support 35, preferably, includes a cylinder-piston unit 37 which is capable of lifting a filled pallet box or cassette, and the skid or slide 34. The piston-cylinder arrangement is preferably pivotably connected to the truck or dolley 36 and at the upper end to a support bracket 38.

FIGS. 4 and 5 best show that the skids or sleds 34 are formed with the support brackets 38 positioned at the end sides of the respective cassettes 12 to locate the cassettes 12 and permit longitudinal and, if necessary, transverse adjustment of placement of the respective cassettes or pallet boxes. The horizontal portion 39 of the bracket 38 is located below the respective cassette; the vertical portion 40' forms an abutment or engagement element against the end wall of the cassette or pallet box. The vertical leg 40', preferably, has an inclined surface, tapering towards the end wall of the cassette so that the cassette will self-align in appropriate position on the support bracket 38 and interference and collision between the end wall of the cassette and the support bracket, during placement, is effectively avoided.

As can be seen, the transport wagon 25 can shift a pallet box or cassette 12 loaded thereon by the transverse shifting arrangement formed by the sleds or skids 34 between the positions 1, 2 and 3. The cylinder-piston unit 37 lifts the respective pallet box 12. Upon providing rotary power to the dolleys or trucks 36, the pallets can thus be shifted along the outer rails 33.

Shift of the pallet boxes 12 along the outer rails 33 by the sled or skid 34 is obtained by a motor 60 which is coupled via a chain or sprocket drive 61 to a shaft 62. Gears 63, at the respective ends of the transport wagon, are engaged with an endless chain 64 which is guided over respective deflection wheels 65, 66, 67 (FIG. 5) and is coupled at its lower horizontally continuous run to the sled or skid 34 by a coupling 68.

Referring again to FIGS. 1 and 2, and also to FIG. 4;

A utilization or removal station 40 is associated with the rack, located at a side thereof. Removal station 40 has two positions 4, 5 next to each other for cassettes or pallet boxes 12. The positions 4, 5 have trackways and rollers 41, 42 which are in alignment in longitudinal direction with the longitudinal direction which the pallet boxes or cassettes 12 have within the racks 13. With respect to the direction which is transverse to the longitudinal direction of the pallet boxes 12, removal station 40 is located in the region between two support posts 17 of the rack system 11.

By drive of the roller system 30, or 41 or 42, cassette 12 can be shifted between the roller track 30 on the transport wagon 25 to the roller track 41 and, either be returned after use, for example of goods therefrom, or can be transferred within the removal station 40 to the roller track 42, so that it can be returned again to the roller track 30 and hence to the position 1 of the transport wagon 25. To change a cassette or pallet box 12 within the removal station 40 itself, a transfer or shifting apparatus or system is used which can be similar to that already described in connection with the transport wagon 25. Consequently, the removal station 40 has outer rails 43 associated with the end faces of a cassette 12. Dolleys or trucks 44 and longitudinally changeable supports 45 can move, horizontally and vertically; a height-adjustable skid or sled, formed with support brackets 46 can receive, above and laterally of the bracket legs 47, 48 portions of the bottom and side walls of a pallet box.

The dolley or truck of the removal station 40 is driven in a manner similar to that described in connection with the transport wagon 25. FIG. 4 consequently and similarly, merely shows a frame 70 to which a motor 71 is coupled, which is connected to a synchronizing shaft 72, driving wheel 73 which is coupled to the dolley or truck to move the skid or sled of the transfer station.

FIG. 2 also schematically shows operating stations 49 located next to the removal station 40 from which manually, or by suitable removal apparatus, goods may be removed from or placed into the respective pallet boxes and cassettes on position 4 of the removal station.

FIG. 6 illustrates the overall system with further includes a second utilization station 54 which may, again, be a station to fill cassettes or remove goods from cassettes. When looking at FIGS. 3, station 54 may be placed at the left outwardly of the leftmost rack system 11. In FIG. 6, at the right side thereof, the last one of the racks of the rack system is shown in fragmentary representation.

The rack, shown only partially in FIG. 6, rather than having a last bottom storage position, has instead a height changeable holding place or position 41 for the pallet boxes 12. The height adjustable holding place 51 is guided in guideways 52, movable therein by running rollers 53, and secured to or forming part of a vertical post 17. The last one of the support rack positions, thus, formed by the holding place 51 can be raised to permit the transport wagon 25 to pass therebeneath.

The utilization station 54, which may be a filling and removal location, can also be considered as a parking space or parking location for a pallet box 12, to place new rod, rail or plate material into a respective pallet box or cassette, or to remove material therefrom.

Referring to FIG. 7 (collectively), which illustrates a portion of FIG. 2 to an enlarged scale and also the association with the wagon or carriage 25:

FIG. 7 clearly shows that the carriage 25 has a general double-T construction. The center beam or portion of the T is formed essentially by the roller track 30. The ends thereof are formed with beams 25', extending transversely to the center portion. The tracks 33 for the skid or sled 34 are so constructed that the parking space or utilization station 54 can be effectively surrounded by the wagon or carriage 25, to permit shifting or transfer of a pallet box from the position 2 of the transport carriage 25 on the utilization or parking station 54, or to receive a cassette at that position from the parking space 54.

Of course, a similar utilization station or parking space 54 can be located at the right side of the rack structure, that is, at the right side of the rightmost rack of FIG. 3.

Operation, loading and unloading sequence, with reference to FIGS. 8-18

The system described in connection with FIG. 1-7 provides for efficient loading and unloading with minimum retracing of paths by the transport wagon or carriage 25, and minimum travel of the rack servicing apparatus 18-22 (FIGS. 1, 3), namely the crane or hoist system.

It is first assumed that the space or position 4 of the removal station 40 is free. To make the space 4 free, a previously handled or processed, and now empty cassette or pallet box A has been shifted by the lateral shifting apparatus forming part of the removal station 40 to the position 5, so that it will be placed on the roller conveyor 42.

All operations to be described hereinafter can be carried out under control of a computerized control unit C, shown only generally in FIG. 8 and, as indicated schematically in FIG. 8 by the broken line, coupled to the horizontal arrow 55, controls the respective movements of cassettes, the carriage or wagon and the like. Other broken lines to command other movements have been omitted from the drawing for clarity since control of such movement by a memory device, which forms part of every control computer, is well known and can be constructed with well known technology.

Figure 9:
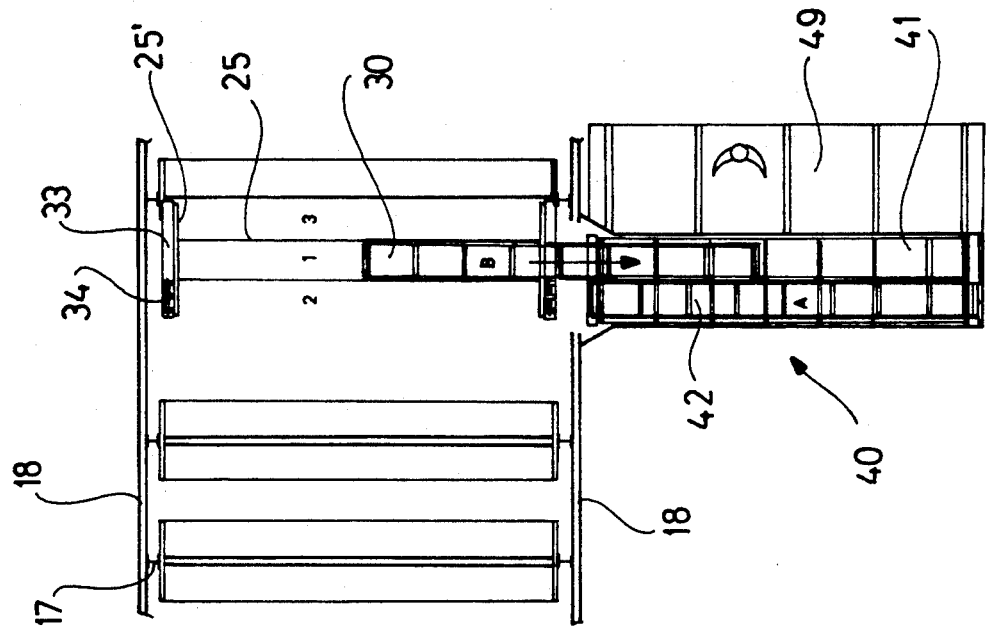
Figure 8:
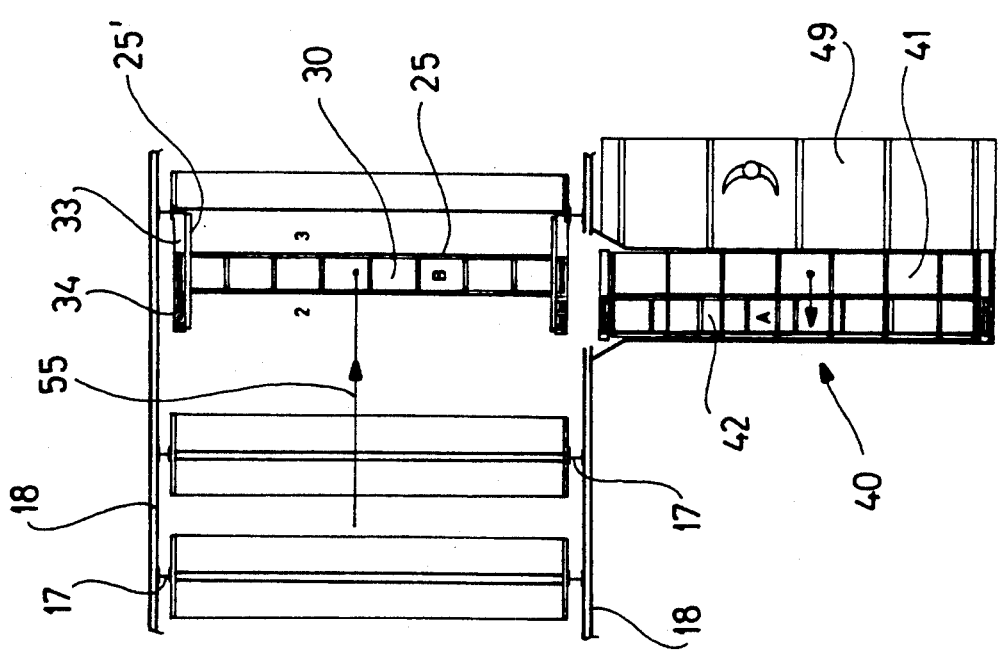

FIG. 8 shows schematically that a full pallet box or cassette B is placed on wagon 25, transported thereto in accordance with the arrow 55 by the rack servicing system 18-22, and placed on the position 1 of the transport wagon. This cassette B can then be moved to the cassette position 4 of the removal station 40 by operating the conveyor 30 on the wagon 25 and conveyer 41 on the removal station 40 (FIG. 9). The location 4 on the removal station 40 has been freed by moving the empty cassette or storage box A to the position 5 of the removal station 40.

In a next step—FIG. 9—the full cassette or pallet box B is moved from the position 1 on the wagon 25 to the position 4 of the removal station 40. In the next step—see FIG. 10—the wagon 25 is moved towards the left by the width of a pallet box, so that the conveyor 30 of the wagon 25 will be in alignment with the conveyor 42 of the removal station 40. The empty cassette A can now be moved, see arrow A10, to the central position 1 of the carriage 25.

Any work, such as removal or addition of goods into the cassette B, can now be done at the work station 49 of the removal or utilization station 40.

As soon as cassette or pallet box A is completely on the carriage 25, that is, has been moved to its end position in accordance with arrow A10, the carriage 25 can move, with the empty pallet box or cassette A thereon, in the direction of a pallet box C, as schematically shown by arrow A11 in FIG. 11. It is here assumed that the control unit CU has commanded that pallet box or cassette C is the next one of the cassettes which are to be processed after the cassette B.

In accordance with a feature of the invention, the empty cassette A on position 1 of the wagon 25 is shifted to the position 2 by the skid or sled 34 of the cassette while the wagon 25 is moving in accordance with the arrow A11. This lateral shift of the box A is shown schematically by arrow A11'. This lateral shift of the pallet box or cassette on the wagon 25, while it is moving to pick or deliver another cassette, substantially increases the overall operating speed of handling.

In accordance with another feature of the invention, shift of the cassette or pallet box A from the position 1 to the position 2 of the carriage 25 is carried out in the direction of movement of the carriage, that is, the direction of shift of arrows A11 and A11' are the same. This shift is such that the empty pallet box or cassette on the wagon 25 is brought in that position which is the rearward position with respect to the cassette C at the next subsequent travel of the wagon 25 to the removal position 40. Thus, the control unit CU has to anticipate the next subsequent movement of the wagon 25. If the wagon 25 were to continue to move towards the left after picking up cassette C, the cassette A would be shifted to position 3.

In many installations, removal stations 40 can be located on both sides of the storage rack system, or the parking station 54 (FIG. 6) can be constructed similarly to the removal station 40. Thus, if two removal stations 40 are present, one as shown in FIG. 11, and another one to the left of the storage racks of FIG. 11, the transport wagon 25 would have to return; furthermore, removal stations 40 can be located not only in alignment with any one of the racks 13, but also along the rack system. Thus, if the carriage 25, shown in the position of FIGS. 10 and 11, would have to move towards the right to a rack system, not shown in FIG. 11, then the cassette A would be shifted to position 3 from the position shown in FIG. 11, that is, again in the direction of movement of the wagon—which would then be counter the direction of arrow A11.

Figure 12:
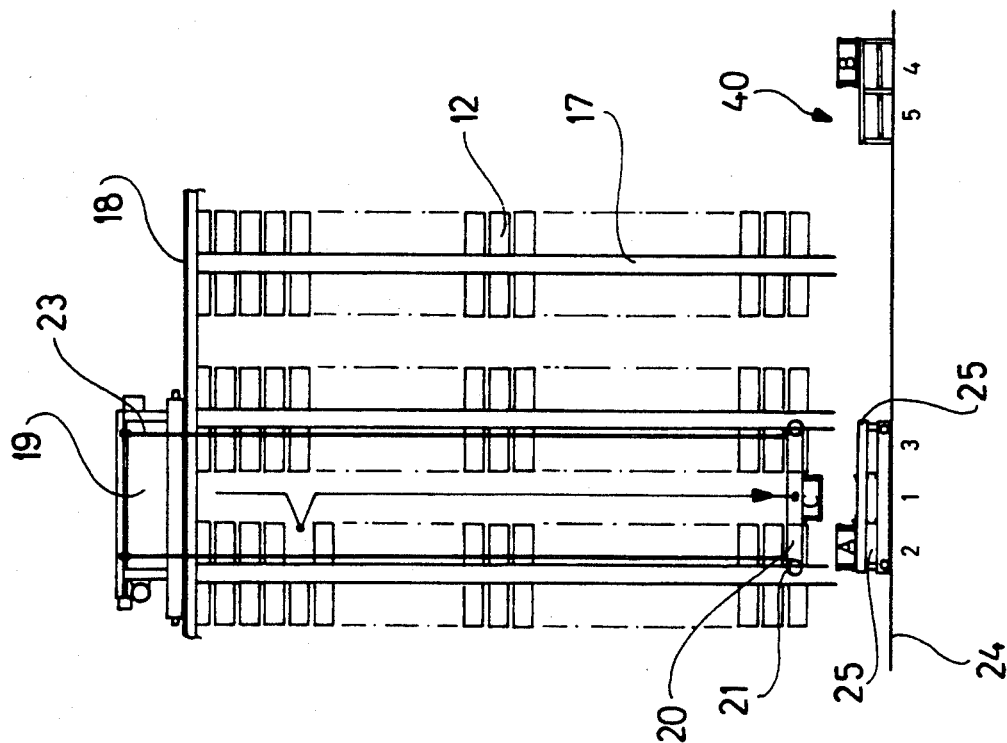

FIG. 12 illustrates wagon 25 in alignment with an exchange cassette C which has been removed, in accordance with the arrow A12, from its storage position in the leftmost rack by the rack service apparatus 19-23. The cassette C is ready to be placed in the center position 1 of the wagon 25, and the handling by the rack service apparatus 19-23 can be done while the wagon 25 was moving to the position shown in FIG. 12. As soon as the wagon 25 reaches the position shown in FIG. 12, rack service apparatus 19 drops the cassette on the wagon 25, in position 1, see FIG. 13. This is readily done by further lowering the beam 20 holding the cassette C, to thereby release the cassette, this additional lowering being shown schematically by arrow A13.

Figure 14:
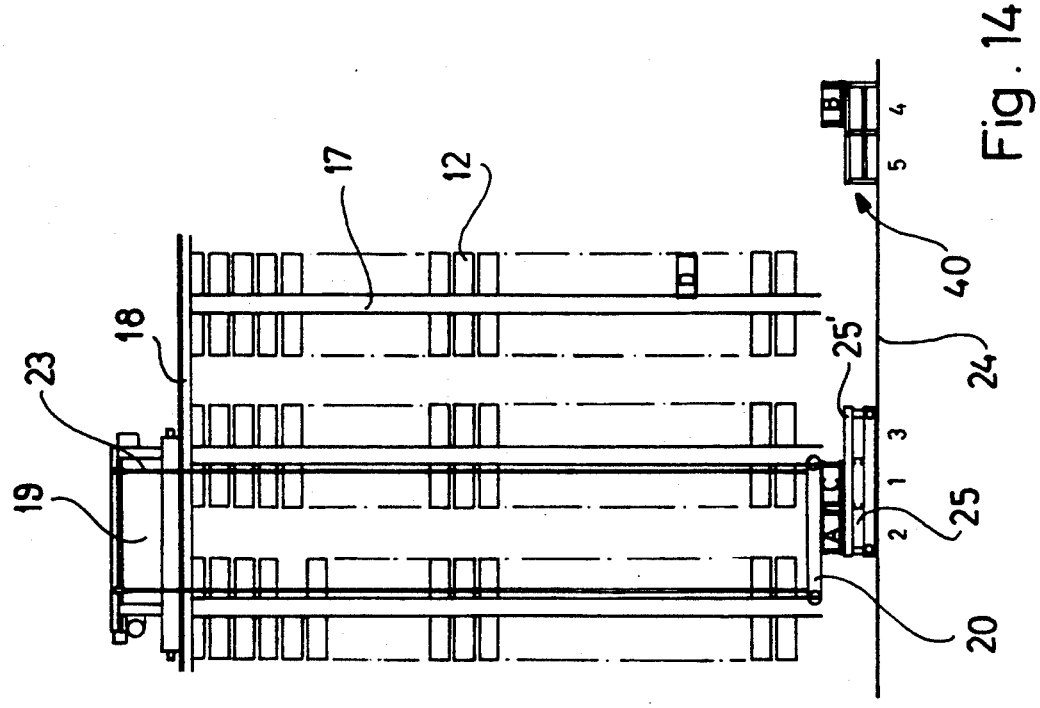

In the next step, and as seen in FIG. 14, the wagon 25 is shifted by one storage position towards the right, so that the empty pallet box or cassette A will be in alignment with the rack service apparatus 19 so that the rack service apparatus can pick up the empty pallet box A. As soon as the pallet box A has been raised enough to clear the vertical legs 40' (FIG. 4) of the support brackets 38, the wagon 25 can move to a next position, as schematically shown by arrow A15 in FIG. 5 while, simultaneously, the pallet box A is placed into the position which was vacated by the pallet box C. The carriage or wagon 25 for operating on or processing the goods in the pallet box C, or the pallet box C itself moves to utilization or removal station 40.

Figure 13:
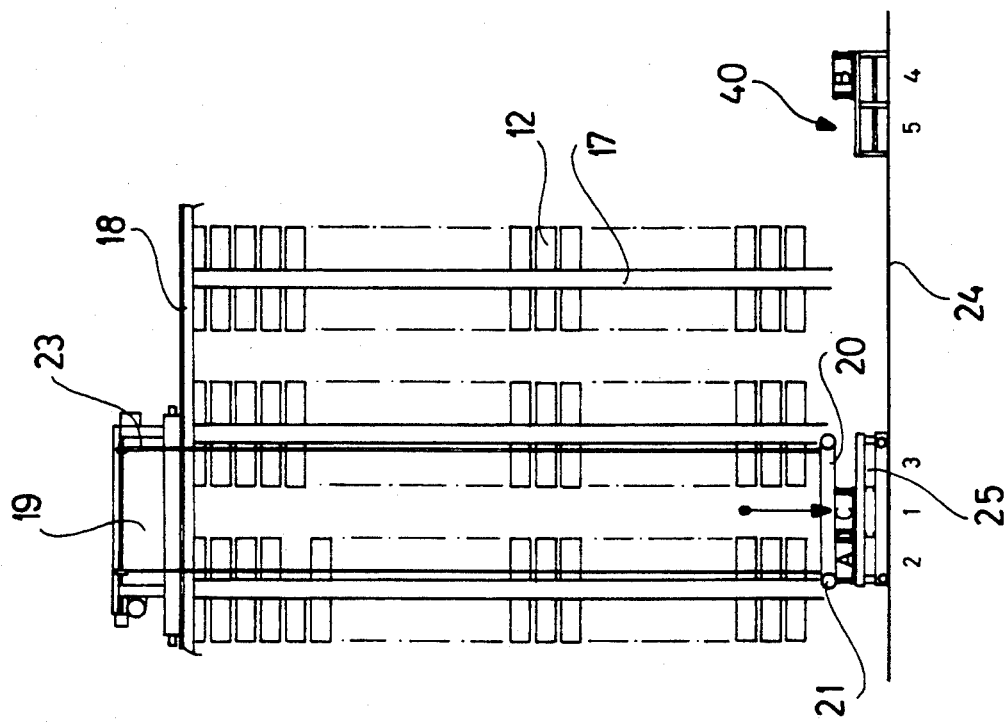
Figure 15:
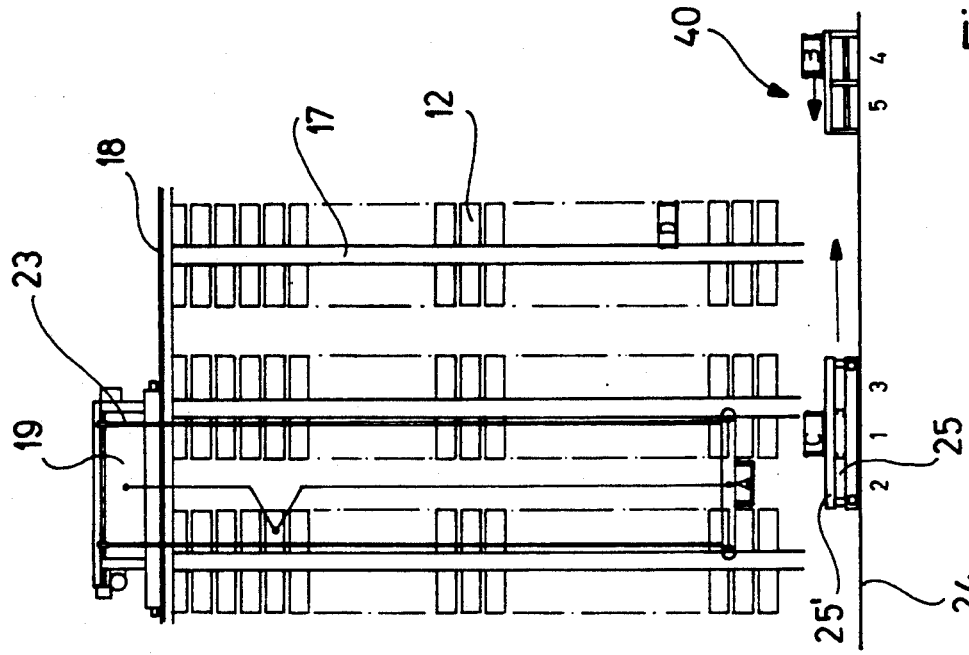

It would, of course, also have been possible to slightly lower the pallet service unit 19 after it has released the pallet box C (FIG. 13) and then maintain the wagon 25 stationary (contrary to FIG. 14) and rather move the pick-up apparatus 22 of the rack service system 19 to the position where the empty pallet box A was located than to move the wagon 25; it is more desirable, and hence preferred, to proceed as explained in connection with FIGS. 13, 14 and 15.

Referring again to FIG. 15:

The empty pallet box A has been picked up by the service system 19, to place it, as shown schematically by arrow A15', in the storage position on the rack which had been vacated by the pallet box C. This arrangement has the specific advantage that the repositioning of the pallet box A is short. For re-storing the pallet box A there is no more readily accessible storage position than the one which was just vacated by the pallet box C. Wagon 25 and rack service apparatus 19 thus need to meet only once for interchange of two pallet boxes.

The irregular and random positioning of pallet boxes on the storage racks of course will result in an arrangement in which any one of the pallet boxes or cassettes does not have a fixed or "home" storage position. This, however, does not present any difficulty, since modern data processing equipment, as shown schematically by unit CU in FIG. 8, can readily record and have available in human-readable form the specific position of any one cassette in the rack system. Pallet boxes A and C have been exchanged.

The arrangement and sequence has the advantage that at any passageway or gangway, rapid and ready interchange of pallet boxes or cassettes is possible; neither the rack service unit or crane 19 nor the wagon 25 are required to carry out any movement which is not absolutely necessary in connection with the interchange of cassettes or pallet boxes and, especially, do not require movement over an extended path—only at most the lateral distance of a cassette or pallet box.

The rack service unit 19 moves only once within any one of the rack passageways, from the top downwardly to place the cassette C (arrow A12, FIG. 12), and then again upwardly, see arrow A15'. The wagon 25 moves only once from the removal station 40 to the particular passageway where a cassette or pallet box exchange is to be carried out, and then, after reversal of direction of movement, and without further stopping, moves directly back to the removal station 40. This rapid movement by the two elements required for placement of the cassettes is highly efficient since the respective cassettes or pallet boxes can be shifted on the positions of the wagon 25 while it is moving, and, as described, with respect to the direction of movement of the wagon, will be the rearward direction after the wagon has changed the direction, that is, after receiving the next subsequent pallet box, that is, pallet box C in the example. This ensures that the position on which the empty pallet box or cassette A is located is the last one which passes the rack service unit 19, and hence ensures rapid interchange of cassettes. In effect, it is possible to so control the operation of the rack service unit and the wagon that the wagon 25 moves, practically continuously, first towards the left (arrow A11) essentially without stopping, until the position in FIG. 12 is reached, and reversing direction of movement in accordance with FIGS. 14 and 15, since the chains or cables 23 of the rack service unit provide some lateral flexibility and the brackets 38 are self-aligning.

Figure 17:
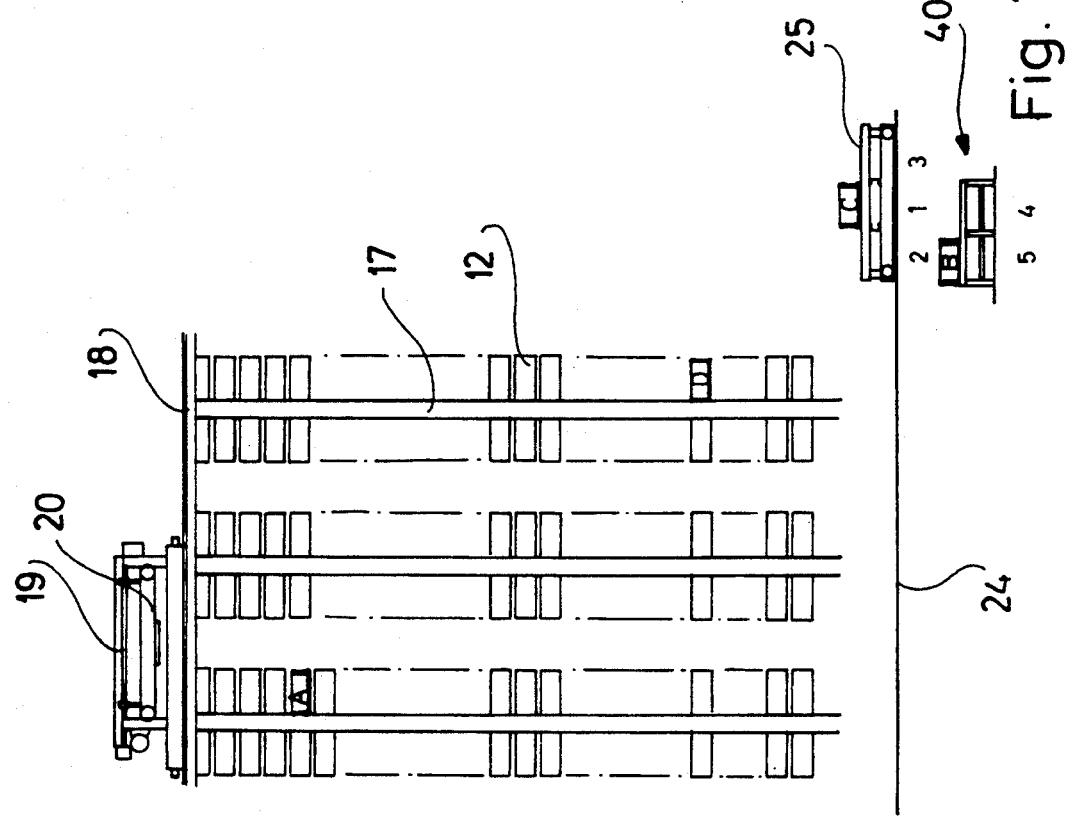
Figure 16:
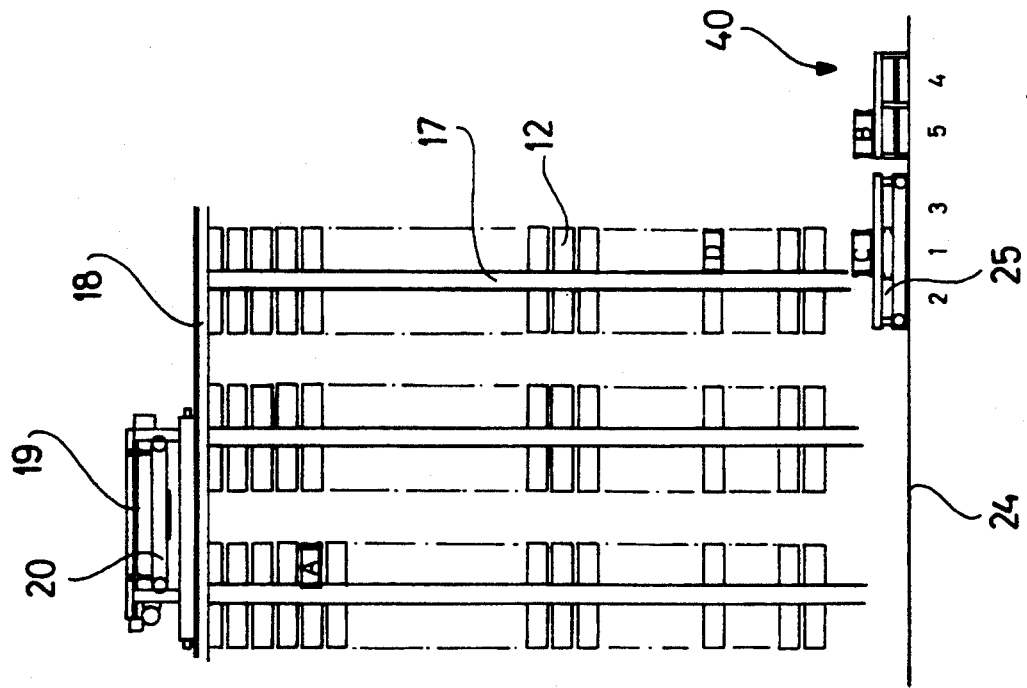

Referring again to the sequence drawings, and specifically to FIG. 16:

The wagon 25 with the cassette C will, after travel in the direction of the arrow A15, approach the removal station 40. At this point, the sequence of steps described in connection with FIG. 8 will repeat. As seen in FIG. 17, the previously processed or worked-on pallet box B has been shifted from the position 4 (FIG. 11) to the position 5. This shift can take place while the wagon 25 is moving and approaching the removal station 40, see FIG. 16.

FIGS. 14-17 show a further or fourth pallet box D which, for example, is the next one to be processed. The pallet box D has been lowered by the rack service unit 19, which traveled to the first rack after positioning pallet box A, and while wagon 25 was moving towards the right, see FIG. 18. Pallet box D is ready at the bottom of a rack way in order to permit exchange for the pallet box C, as heretofore described.

The arrangement and sequence can be slightly varied, as illustrated schematically in the sequence of FIGS. 19-25.

Figure 19:
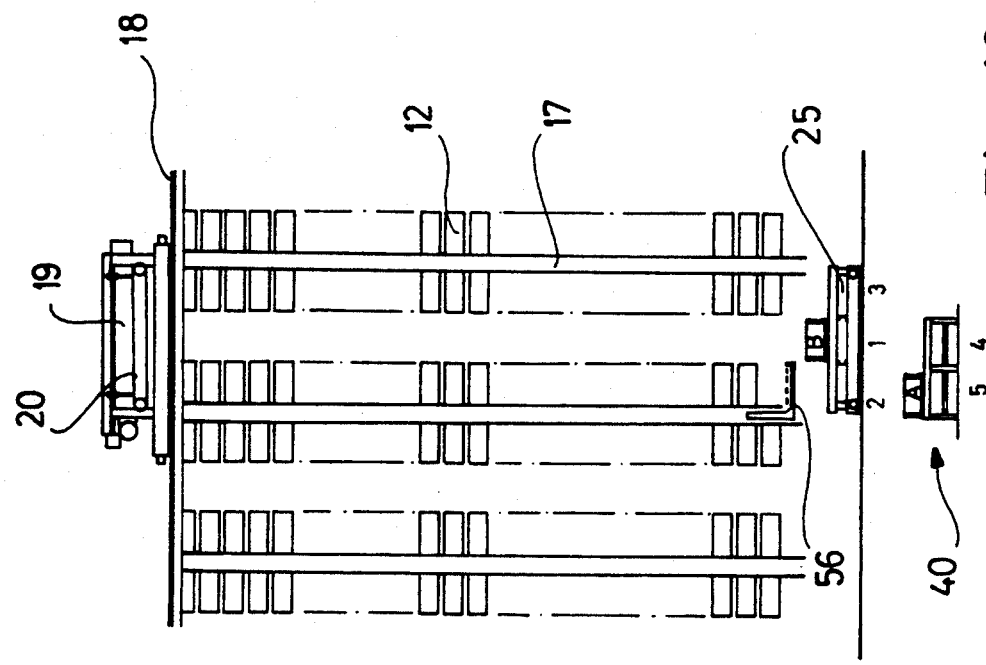
Figure 18:
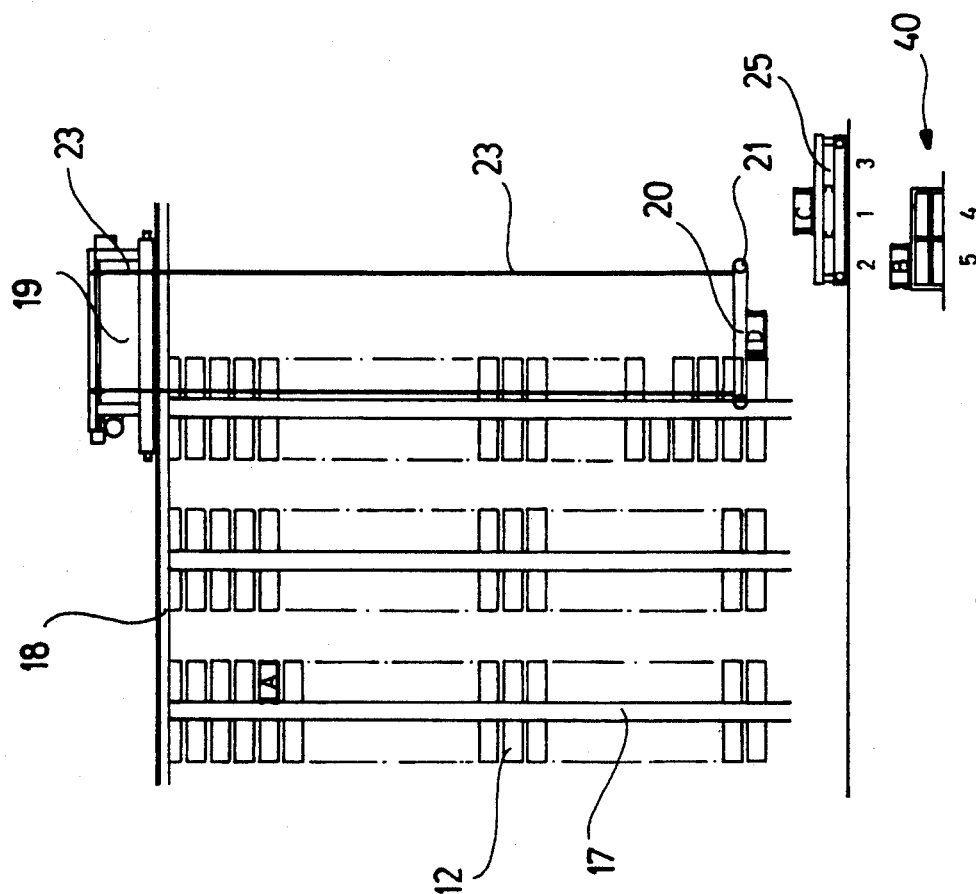

Referring to FIG. 19:

The cassette position 5 of the removal station 40, and having the conveyor 42, is in alignment with a schematically shown conveyor system 56 which is height-adjustably secured to the associated support post 17 of the respective rack, see also FIG. 6. The position of the conveyor 56 is such that, normally, the wagon 25 can pass therebeneath.

Figure 21:
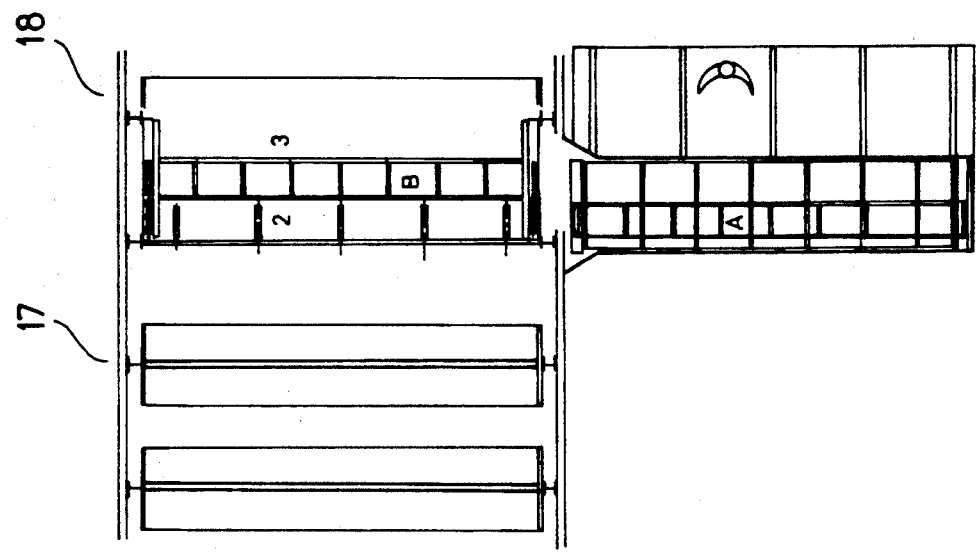
Figure 20:
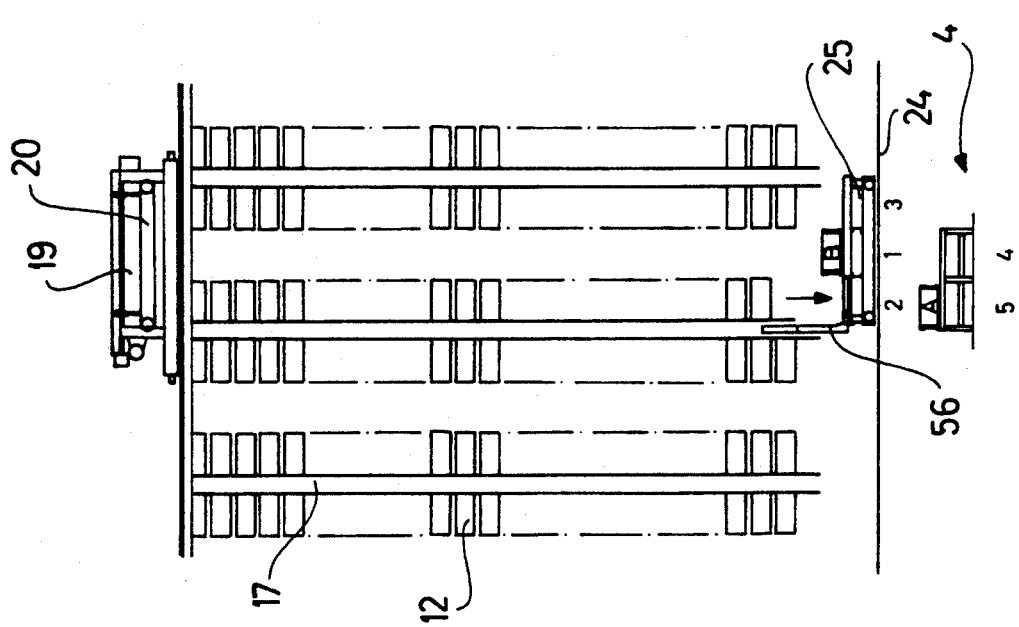
Figure 23:
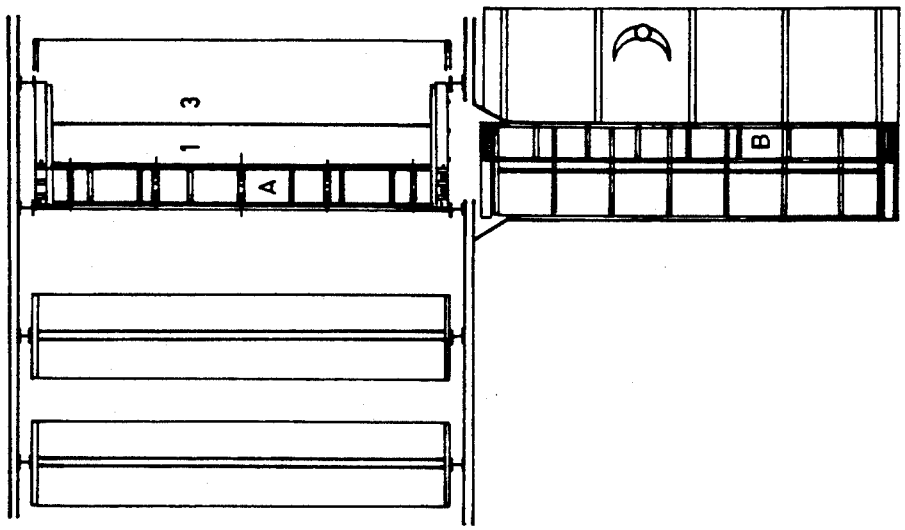
Figure 22:
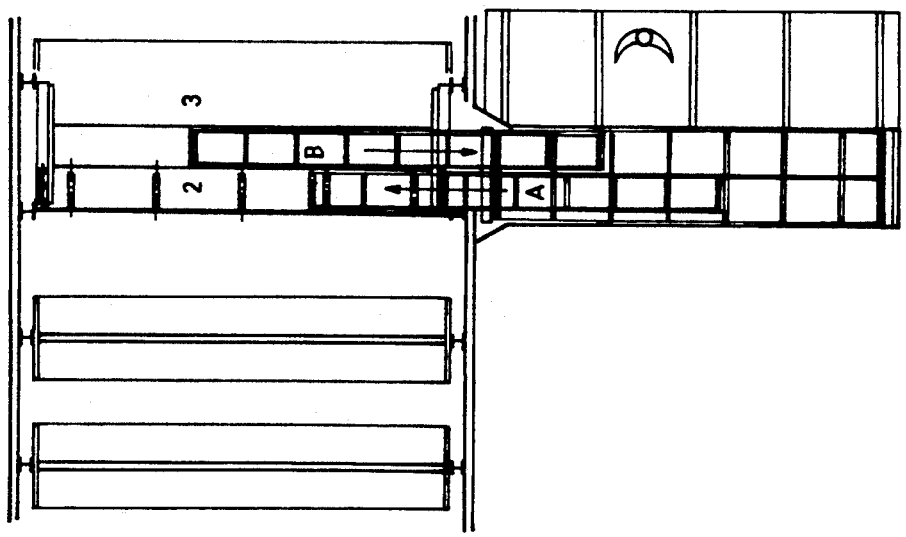
Figure 25:
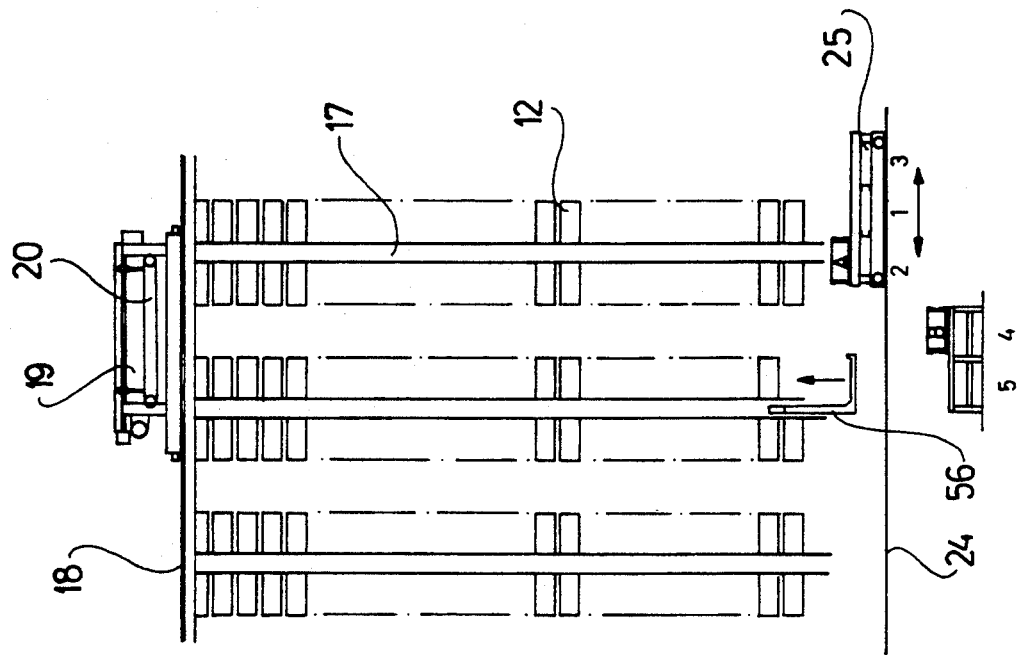
Figure 24:
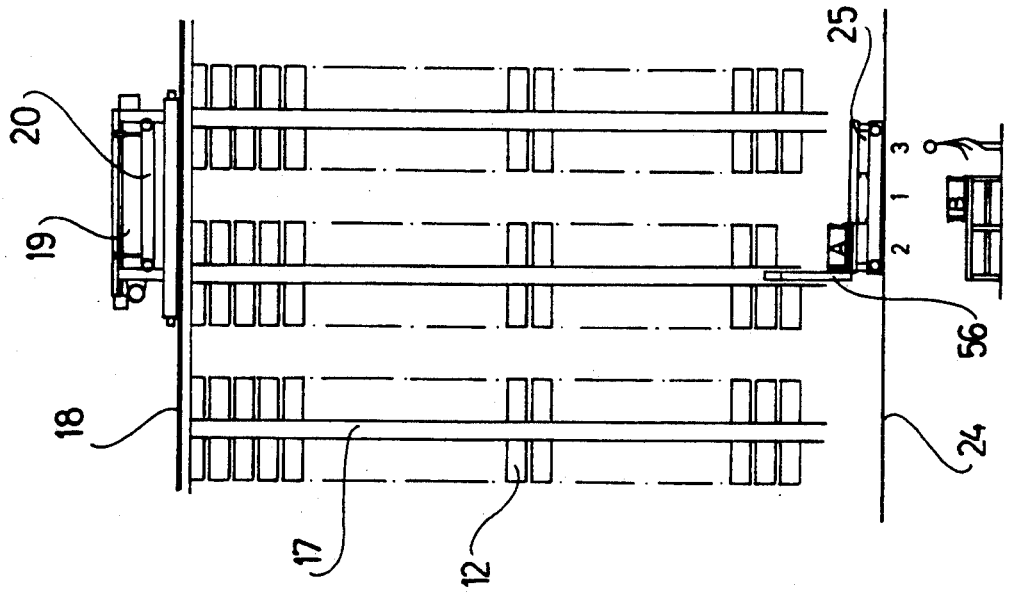

FIG. 19 illustrates wagon 25 having just passed beneath the conveyor 56, and carrying pallet box B in the center or 1 position. In the next step, see FIG. 20, the conveyor 56 is lowered to the level of the wagon 25 which, as shown in FIGS. 21, 22 and 23, permits simultaneous exchange of pallet boxes between the empty box A and the full box B by respective movement in accordance with the arrows A22 and A22', as seen in FIG. 22. As schematically shown in FIG. 24, the empty pallet box A is removed by the conveyor 56 by use of the skid or sled on the wagon 25 from the wagon 25.

Alternatively, and in dependence on the subsequent direction of travel of the wagon 25, the shift apparatus 34 could also shift the empty cassette or pallet box to the position 2, or leave it there if it was already at that position, or to shift it over position 1 to position 3 if subsequent travel of the wagon 25 should be to the right. Shift of the cassette, thus, can be in either direction as shown by the double arrow A25 in dependence on the next subsequent movement of the wagon 25.

Referring again to FIG. 6:

Under some conditions, carriage 25 may be required to bring a cassette or pallet box to a parking position 54. This may, for example, be an empty pallet box. If so, during travel of the wagon 25, an empty cassette is shifted to the position 2, that is, the position which will be closest to the parking station 54—at the left in FIG. 6. This permits rapid placement of the respective pallet box on the parking position, since time to shift an empty pallet box to the next adjacent position can be taken simultaneously with the time to move the wagon to the parking shifting position. Upon the return path of a cassette into the storage system, a previously filled storage box can then be received directly upon lowering of the rack by the mechanism 52, 53 so that a previously filled cassette at position 51 can be immediately received by the wagon 25, for transfer to an appropriate position on the wagon 25 as it moves to the respective gangway or pathway between the racks, or to the station 40.

The sequencing of movement, as explained in connection with FIGS. 8-25, permits time-saving interchange of cassettes between the transport wagon 25 and the rack service unit 19-22, by simultaneous movement of the wagon and the rack service unit in their respective position so that they can meet at a single meeting point. It is not a necessary requirement that the cassette or pallet box picked up from the carriage be placed at the specific location from which a previous cassette or pallet box was removed; if the rack contains other empty spaces, and in accordance with a feature of the invention, the cassette or pallet box to be placed in the rack system can be placed elsewhere, for example by being transported by the transport system to a different rack structure 13. Sufficient time is available for such additional transport, since the transport wagon 25 delivers the cassette which it had just received to the removal station 40 for exchange against an empty cassette at a later time. Change of the position of the cassettes or storage boxes on the wagon as it moves further accelerates the arrangement. Doing so in the direction of movement of the wagon provides for ease of handling.

The removal station 40 can be located wherever it is desired, and a plurality of such removal stations may be provided. The carriage can move the respective pallet boxes at random. It can receive pallet boxes for storage of its contents, as well as empty cassettes. The removal station thus can move the pallet boxes not only longitudinally on its own conveyors 41, 42, but also transversely with respect to the longitudinal direction, so that elongated rail or plate-material can be readily handled. The respective pallet box to be placed on the transport wagon can then be shifted on the transport wagon, so that a full cassette is at the rear with respect to the transport direction or direction of movement of the wagon.

Placing a full cassette at the end position, that is position 2 or 3 on the wagon, has the advantage that handling or processing of contents of the pallet boxes, or of the entire pallet boxes, is facilitated.

The interchange of cassettes or pallet boxes on the wagon 25 by the rack service unit 19 can be carried out in two ways: As first described in connection with FIGS. 12-14, and preferred, the cassette C which is removed from the rack is first placed on the carriage 25, the carriage 25 then shifts by one cassette position in the direction towards the removal station 40 and the rack service unit or crane or hoist then picks up the cassette upon reversal, for example a short stop, or slow or creep movement of the transport carriage. It is, however, also possible to so operate the rack service unit that the unit 19 drops the cassette C on the transport wagon 25, then shifts laterally to move in line with the cassette B to be picked up, picks up the cassette B and lifts it clear from the transport wagon 25, whereupon the transport wagon 25 can return to the removal station 40. This is, conceptually, simpler than the preferred sequence, although it takes slightly longer time.

In accordance with a basic feature of the invention, the transport wagon 25 is equipped with a lateral shifting apparatus 30, capable of lifting and laterally shifting a pallet box or cassette located on the transport wagon between at least two positions, that is, between positions 1 and 2, and 1 and 3, respectively, or entirely across the transport wagon, if it has three positions, from position 2 to position 3. The arrangement of the carriage 25 with the lateral shift apparatus permits shift of pallet boxes or cassettes on the wagon as it moves from the removal station 40 to a respective cassette loading position, or between cassette loading/unloading positions, that is, in alignment with rackways or gangways. This shifting, carried out during movement of the wagon 25, ensures that, upon meeting of the rack service unit 19 and the wagon 25, the position of the pallet box on the wagon is appropriate for placing a cassette or pallet box from the rack on the wagon and pick-up of a cassette or pallet box to be exchanged from the wagon for placement on the rack in the just vacated position. This can be carried out during brief stops of the wagon or while the wagon is actually moving, for example at slow or "creep" speed.

The wagon 25, thus, is so arranged that it has at least two adjacent pallet box positions 1, 2 and 1, 3, one of which has a longitudinal conveyor and, further, apparatus associated with the wagon to permit lateral shifting from the conveyor to the adjacent position, e.g. position 2 or 3 from or to position 1. By placing two pallet positions 2, 3 adjacent a central position 1 which has a longitudinal conveyor, the next cassette or pallet box to be stored can be shifted to the rearward position—in the direction of later intended movement of the wagon 25—during movement of the wagon 25.

In accordance with a particularly preferred embodiment of the invention, the wagon 25 is, in plan view, generally C-shaped or double-T-shaped. The center leg of this plan view can correspond with the placement of the longitudinal conveyor system, and the free legs of the shape of the plan view are formed by horizontal or cross beams 25' which define the respective cassette positions, and provide support for sleds or skids which can move in relatively synchronized movement along these legs in a horizontal direction.

The particular shape of the wagon 25 permits ready matching to removal or filling stations so that the cassette positions can fit around or adjacent a table or other handling arrangement, so that cassettes or pallet boxes to be filled or emptied, can be placed directly on removal or utilization positions, on parking positions or the like. By locating lateral shifting apparatus on the removal position and/or the parking position, cassette can be readily shifted between the removal stations or positions and the wagon.

The removal position or station preferably also has apparatus to lift pallet boxes or cassettes, for example the cylinder-piston units 45, corresponding to the lifting unit 37 on the wagon 25. This permits simultaneous inter-change of pallet boxes between the transport wagon 25 and a removal position with placement of a cassette or pallet box for relocation in a rack structure.

Use of cylinder-piston arrangements, linked to dolleys or trucks, movable on rails, and retaining sleds or skids on which the pallets can be placed, permits freeing the pallet boxes from a position on the wagon 25 or the removal position, respectively, by lifting the pallet boxes, to permit subsequent lateral shift thereof. Angle brackets 38, 46, engaging beneath and laterally of the pallet boxes, provide for reliable positioning of the pallet boxes and, by tapering vertical legs of the angle brackets, permit initial misalignment of the pallet boxes with respect to the positions on the wagon 25 or the removal unit 40, respectively, and self-alignment upon placement of the pallet boxes on the respective wagon or unit. The placement of such angle brackets furthermore permits continuous realignment of the pallet boxes in appropriate direction, so that any possible misalignment due to handling by the rack service system 19 is compensated at each exchange of a pallet box, so that alignment errors do not become cumulative.

The conveyors, suitably, are roller conveyors, forming roller tracks or the like on which the cassettes or pallet boxes can be moved; some or all of the rollers can be driven by a power drive for ease of handling and, importantly, for automatic handling under control of the control unit CU.

The embodiment described in connection with FIGS. 6 and 19 has the additional advantages to permit transfer of a pallet box from the wagon 25 to the removal station 40 simultaneously with placement of a different pallet box on the wagon 25. Thus, by forming the lowest one of the racks to be height-adjustable, as schematically shown by arrow A6 in FIG. 6, and supplying it with a longitudinally arranged conveyor 56 (FIG. 19), for example a roller conveyor, a cassette to be placed in the storage rack can be transferred thereto. Upon lowering the conveyor, or lifting the shift apparatus on the wagon 25, a pallet box can be placed on the carriage 25 which, later on upon movement of the wagon, can be shifted in the appropriate or desired cassette position on the wagon 25 during its movement for picking up or interchanging the just received cassette or another cassette.

The various operations and operating steps can be carried out in suitable sequences under control of the control unit CU, automatically, or in accordance with predetermined programs. The interrelationship of these sequences and programs are well known and need not be described in detail, and any suitable programming of any one of the many available control units can be used.

Various changes and modifications may be made, and any features described herein may be used with any of the others, within the scope of the inventive concept.

We claim:

1. A handling method for handling goods in a system for handling the goods, wherein said goods are retained in a plurality of storage means (12), each defining a longitudinal side;

wherein said system includes a plurality of storage racks (13), each storage rack having support means (15) for said storage means (12) positioned transversely to the longitudinal sides of the storage means, and wherein the storage racks, each, are spaced from each other and define, transversely to the longitudinal sides on the storage racks, rack passageways between adjacent racks; and a transport wagon (25, 25') for moving the storage means between said storage locations on said racks and a remote utilization station (40, 54), said remote utilization station transferring said good into and out of said storage means (12), said transport wagon being movable on a support means transversely with respect to said passageways and passing at least in part beneath a lowest one of said support means (15) of the racks (12), said transport wagon having at least two adjacent locations (1, 2, 3) thereon for at least one (A) of said storage means (12), and conveyor means (30) operatively engageable with at least one of the storage means (12) on said transport wagon and having a conveying direction for moving said one of said storage means in a direction parallel to the longitudinal side to define, on said wagon, a removal location; and load transferring means (19, 23) movable in said passageways and transversely of said longitudinal side for transferring said storage means (12) between the storage locations of said storage racks, and said wagon, said method comprising the steps of identifying a selected storage location on a selected one of said storage racks, at which selected storage location a specific one of said storage means, among said plurality of storage means (12), is located, wherein said specific storage means defines an exchange storage means (C), and said at least one storage means on said transport wagon defines a prior storage means (A);

operating said load transferring means (19, 23) to remove the exchange storage means (C) from said identified selected storage location and to place said exchange means (C) on said transport wagon (25, 25') at a location adjacent said prior storage means (A); and placing said prior storage means (A) at said selected identified storage location on said selected one of said storage racks which had become empty upon removal of the exchange storage means (C) from said identified selected location.

2. The method of claim 1, including the steps of moving the transport wagon (25, 25') towards said one of the storage locations which forms said identified selected storage location from which the exchange means (C) is to be removed;

shifting the position of the prior storage means (A) on the transport wagon by said conveyor means (30) on the transport wagon transversely with respect to said longitudinal side; and carrying out the step of removing the exchange storage means (C) from its storage location in the rack and placing it on the transport wagon and removing the previously shifted prior storage means (A)

from the wagon (25, 25') and placing it in the identified location in the rack vacated by the exchange storage means (C).

3. The method of claim 2, wherein said step of shifting the position of the prior storage means (A) on the transport wagon is carried out during movement of the transport wagon towards said identified selected location.

4. The method of claim 2, wherein said step of shifting the prior storage means (A) on the transport wagon during movement thereof transversely to the longitudinal side comprises shifting said prior storage means (A) on the wagon (25, 25') to a position which, with respect to movement of the wagon, will be at a trailing side of the wagon upon subsequent movement of the wagon after placing of the exchange pallet box (C) thereon.

5. The method of claim 4, wherein said subsequent movement of the wagon is in a direction towards said utilization station (40, 54).

6. The method of claim 5, including the step of moving the wagon (25, 25') in the direction towards said utilization station (40, 54) subsequent to placing the exchange pallet box (C) thereon.

7. The method of claim 2, wherein said step of operating the load transferring means (19, 23) is initiated upon incipient movement of the transport wagon (25, 25') towards a further location with the exchange pallet box (C) thereon, to commence removal of the prior storage means (A) upon said incipient movement of the transport wagon.

8. The method of claim 1, including the steps of
individually identifying said storage means (12);
identifying locations of the storage means (12) on the transport wagon (25, 25');
and further including the steps of
storing the locations of the storage means (12) on said storage rack (12) and on said transport wagon (25, 25');
controlling movement of the transport wagon (25, 25'); and
associating the position of the exchange storage means (C) at an identified storage location, and recording said position of the identified storage location upon exchange of the prior storage means (A) and the exchange storage means (C) at said identified storage location.

* * * * *